US008315867B1

(12) United States Patent
Blair et al.

(10) Patent No.: US 8,315,867 B1
(45) Date of Patent: Nov. 20, 2012

(54) SYSTEMS AND METHODS FOR ANALYZING COMMUNICATION SESSIONS

(75) Inventors: Christopher D. Blair, East Sussex (GB); Joseph Watson, Alpharetta, GA (US)

(73) Assignee: Verint Americas, Inc., Roswell, GA (US)

( * ) Notice: Subject to any disclaimer, the term of this patent is extended or adjusted under 35 U.S.C. 154(b) by 1344 days.

(21) Appl. No.: 11/691,521

(22) Filed: Mar. 27, 2007

Related U.S. Application Data

(63) Continuation of application No. 11/540,736, filed on Sep. 29, 2006, now Pat. No. 7,885,813.

(51) Int. Cl.
*G10L 15/00* (2006.01)

(52) U.S. Cl. ............ 704/246; 704/251; 379/88.1; 705/1

(58) Field of Classification Search .................. 704/246, 704/251; 379/88.1; 705/1
See application file for complete search history.

(56) References Cited

U.S. PATENT DOCUMENTS

| | | | |
|---|---|---|---|
| 3,594,919 | A | 7/1971 | De Bell et al. |
| 3,705,271 | A | 12/1972 | De Bell et al. |
| 4,510,351 | A | 4/1985 | Costello et al. |
| 4,684,349 | A | 8/1987 | Ferguson et al. |
| 4,694,483 | A | 9/1987 | Cheung |
| 4,763,353 | A | 8/1988 | Canale et al. |
| 4,815,120 | A | 3/1989 | Kosich |
| 4,924,488 | A | 5/1990 | Kosich |
| 4,953,159 | A | 8/1990 | Hayden et al. |
| 5,016,272 | A | 5/1991 | Stubbs et al. |
| 5,101,402 | A | 3/1992 | Chiu et al. |
| 5,117,225 | A | 5/1992 | Wang |
| 5,210,789 | A | 5/1993 | Jeffus et al. |
| 5,239,460 | A | 8/1993 | LaRoche |
| 5,241,625 | A | 8/1993 | Epard et al. |
| 5,267,865 | A | 12/1993 | Lee et al. |
| 5,299,260 | A | 3/1994 | Shaio |
| 5,311,422 | A | 5/1994 | Loftin et al. |
| 5,315,711 | A | 5/1994 | Barone et al. |
| 5,317,628 | A | 5/1994 | Misholi et al. |
| 5,347,306 | A | 9/1994 | Nitta |
| 5,388,252 | A | 2/1995 | Dreste et al. |
| 5,396,371 | A | 3/1995 | Henits et al. |
| 5,432,715 | A | 7/1995 | Shigematsu et al. |
| 5,465,286 | A | 11/1995 | Clare et al. |

(Continued)

FOREIGN PATENT DOCUMENTS

EP 0453128 A2 10/1991

(Continued)

OTHER PUBLICATIONS

Notification of Transmittal of the International Search Report and the Written Opinion of the International Searching Authority, dated Jan. 29, 2008.

(Continued)

*Primary Examiner* — Daniel D Abebe
(74) *Attorney, Agent, or Firm* — McKeon, Meunier, Carlin & Curfman

(57) ABSTRACT

Systems and methods for analyzing communication sessions are provided. A representative method includes: recording the communication session; identifying those portions of the communication session not containing speech of at least one of an agent and a customer; and performing processing on the recording of the communication session based, at least in part, on whether the portions contain speech of at least one of the agent and the customer.

20 Claims, 4 Drawing Sheets

U.S. PATENT DOCUMENTS 5,475,625 A 12/1995 Glaschick
5,485,569 A 1/1996 Goldman et al.
5,491,780 A 2/1996 Fyles et al.
5,499,291 A 3/1996 Kepley
5,526,407 A 6/1996 Russell et al.
5,535,256 A 7/1996 Maloney et al.
5,572,652 A 11/1996 Robusto et al.
5,577,112 A 11/1996 Cambray et al.
5,590,171 A 12/1996 Howe et al.
5,597,312 A 1/1997 Bloom et al.
5,619,183 A 4/1997 Ziegra et al.
5,696,906 A 12/1997 Peters et al.
5,717,879 A 2/1998 Moran et al.
5,721,842 A 2/1998 Beasley et al.
5,742,670 A 4/1998 Bennett
5,748,499 A 5/1998 Trueblood
5,778,182 A 7/1998 Cathey et al.
5,784,452 A 7/1998 Carney
5,790,798 A 8/1998 Beckett, II et al.
5,796,952 A 8/1998 Davis et al.
5,809,247 A 9/1998 Richardson et al.
5,809,250 A 9/1998 Kisor
5,825,869 A 10/1998 Brooks et al.
5,835,572 A 11/1998 Richardson, Jr. et al.
5,862,330 A 1/1999 Anupam et al.
5,864,772 A 1/1999 Alvarado et al.
5,884,032 A 3/1999 Bateman et al.
5,907,680 A 5/1999 Nielsen
5,918,214 A 6/1999 Perkowski
5,923,746 A 7/1999 Baker et al.
5,933,811 A 8/1999 Angles et al.
5,944,791 A 8/1999 Scherpbier
5,948,061 A 9/1999 Merriman et al.
5,958,016 A 9/1999 Chang et al.
5,964,836 A 10/1999 Rowe et al.
5,978,648 A 11/1999 George et al.
5,982,857 A 11/1999 Brady
5,987,466 A 11/1999 Greer et al.
5,990,852 A 11/1999 Szamrej
5,991,373 A 11/1999 Pattison et al.
5,991,796 A 11/1999 Anupam et al.
6,005,932 A 12/1999 Bloom
6,009,429 A 12/1999 Greer et al.
6,014,134 A 1/2000 Bell et al.
6,014,647 A 1/2000 Nizzari et al.
6,018,619 A 1/2000 Allard et al.
6,035,332 A 3/2000 Ingrassia et al.
6,038,544 A 3/2000 Machin et al.
6,039,575 A 3/2000 L'Allier et al.
6,057,841 A 5/2000 Thurlow et al.
6,058,163 A 5/2000 Pattison et al.
6,061,798 A 5/2000 Coley et al.
6,067,517 A * 5/2000 Bahl et al. .................. 704/256.4
6,072,860 A 6/2000 Kek et al.
6,076,099 A 6/2000 Chen et al.
6,078,894 A 6/2000 Clawson et al.
6,091,712 A 7/2000 Pope et al.
6,108,711 A 8/2000 Beck et al.
6,122,665 A 9/2000 Bar et al.
6,122,668 A 9/2000 Teng et al.
6,130,668 A 10/2000 Stein
6,138,139 A 10/2000 Beck et al.
6,144,991 A 11/2000 England
6,146,148 A 11/2000 Stuppy
6,151,622 A 11/2000 Fraenkel et al.
6,154,771 A 11/2000 Rangan et al.
6,157,808 A 12/2000 Hollingsworth
6,171,109 B1 1/2001 Ohsuga
6,178,239 B1 * 1/2001 Kishinsky et al. ....... 379/266.07
6,182,094 B1 1/2001 Humpleman et al.
6,195,679 B1 2/2001 Bauersfeld et al.
6,201,948 B1 3/2001 Cook et al.
6,211,451 B1 4/2001 Tohgi et al.
6,225,993 B1 5/2001 Lindblad et al.
6,230,197 B1 5/2001 Beck et al.
6,236,977 B1 5/2001 Verba et al.
6,244,758 B1 6/2001 Solymar et al.
6,249,570 B1 * 6/2001 Glowny et al. ............ 379/88.22
6,282,548 B1 8/2001 Burner et al.
6,286,030 B1 9/2001 Wenig et al.
6,286,046 B1 9/2001 Bryant
6,288,753 B1 9/2001 DeNicola et al.
6,289,340 B1 9/2001 Puram et al.
6,301,462 B1 10/2001 Freeman et al.
6,301,573 B1 10/2001 McIlwaine et al.
6,324,282 B1 11/2001 McIlwaine et al.
6,347,374 B1 2/2002 Drake et al.
6,351,467 B1 2/2002 Dillon
6,353,851 B1 3/2002 Anupam et al.
6,360,250 B1 3/2002 Anupam et al.
6,370,574 B1 4/2002 House et al.
6,404,857 B1 6/2002 Blair et al.
6,411,989 B1 6/2002 Anupam et al.
6,418,471 B1 7/2002 Shelton et al.
6,459,787 B2 10/2002 McIlwaine et al.
6,487,195 B1 11/2002 Choung et al.
6,493,758 B1 12/2002 McLain
6,502,131 B1 12/2002 Vaid et al.
6,510,220 B1 1/2003 Beckett, II et al.
6,535,909 B1 3/2003 Rust
6,542,602 B1 4/2003 Elazar
6,546,405 B2 4/2003 Gupta et al.
6,560,328 B1 5/2003 Bondarenko et al.
6,583,806 B2 6/2003 Ludwig et al.
6,606,657 B1 8/2003 Zilberstein et al.
6,651,042 B1 * 11/2003 Field et al. .................... 704/270
6,665,644 B1 12/2003 Kanevsky et al.
6,674,447 B1 1/2004 Chiang et al.
6,683,633 B2 1/2004 Holtzblatt et al.
6,697,858 B1 2/2004 Ezerzer et al.
6,724,887 B1 4/2004 Eilbacher et al.
6,738,456 B2 5/2004 Wrona et al.
6,757,361 B2 6/2004 Blair et al.
6,772,396 B1 8/2004 Cronin et al.
6,775,377 B2 8/2004 McIlwaine et al.
6,792,575 B1 9/2004 Samaniego et al.
6,810,414 B1 10/2004 Brittain
6,820,083 B1 11/2004 Nagy et al.
6,823,384 B1 11/2004 Wilson et al.
6,870,916 B2 3/2005 Henrikson et al.
6,901,438 B1 5/2005 Davis et al.
6,959,078 B1 10/2005 Eilbacher et al.
6,965,886 B2 11/2005 Govrin et al.
7,076,051 B2 7/2006 Brown et al.
7,295,970 B1 11/2007 Gorin et al.
2001/0000962 A1 5/2001 Rajan
2001/0032335 A1 10/2001 Jones
2001/0043697 A1 11/2001 Cox et al.
2002/0038363 A1 3/2002 MacLean
2002/0052948 A1 5/2002 Baudu et al.
2002/0065911 A1 5/2002 von Klopp et al.
2002/0065912 A1 5/2002 Catchpole et al.
2002/0128925 A1 9/2002 Angeles
2002/0143925 A1 10/2002 Pricer et al.
2002/0165954 A1 11/2002 Eshghi et al.
2003/0055883 A1 3/2003 Wiles et al.
2003/0079020 A1 4/2003 Gourraud et al.
2003/0144900 A1 7/2003 Whitmer
2003/0154240 A1 8/2003 Nygren et al.
2004/0100507 A1 5/2004 Hayner et al.
2004/0165717 A1 8/2004 McIlwaine et al.
2004/0249650 A1 * 12/2004 Freedman et al. ................ 705/1
2005/0138560 A1 6/2005 Lee et al.
2006/0198504 A1 9/2006 Shemisa et al.
2006/0265089 A1 11/2006 Conway et al.
2006/0289622 A1 12/2006 Khor et al.
2007/0297577 A1 12/2007 Wyss
2008/0037719 A1 2/2008 Doren
2008/0260122 A1 10/2008 Conway et al.

FOREIGN PATENT DOCUMENTS

EP 0773687 A2 5/1997
EP 0989720 3/2000
GB 2369263 5/2002
WO WO 98/43380 11/1998
WO WO 00/16207 3/2000

OTHER PUBLICATIONS

Glass, J., Chang, J. and McCandless, M., 1996, A probabilistic framework for feature-based speech recognition [online]. ICSLP Philadelphia, PA, pp. 2277-2280, Oct. 1996 [retrieved Dec. 18, 2007]. Retrieved from the Internet: http://groups.csail.mit.edu/sls/publications/1996/icslp96-summit.pdf, p. 2, paragraph 8.
"Customer Spotlight: Navistar International," Web page, unverified print date of Apr. 1, 2002.
"DKSystems Integrates QM Perception with OnTrack for Training," Web page, unverified print date of Apr. 1, 2002, unverified cover date of Jun. 15, 1999.
"OnTrack Online Delivers New Web Functionality," Web page, unverified print date of Apr. 2, 2002, unverified cover date of Oct. 5, 1999.
"Price WaterouseCoopers Case Study The Business Challenge," Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of A1 in Education," *AMC Crossroads* vol. 1: 1-13 (Fall 1996) Web page, unverified print date Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Coursewae through Adaptive Linking,"*ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
De Bra et al., "Adaptive Hypermedia: From Systems to Framework,"*ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report,"*Educational Technical* pp. 7-16 (Mar. 1992).
Diessel et al., "Individualized Course Generation: A Marriage Between CAL and ICAL,"*Computers Educational* 22(1/2) 57-65 (1994).
Dyreson, "An Experiment in Class Management Using the World Wide Web," pp. 1-12, Web page, unverified print date of Apr. 12, 2002.
E Learning Community, "Excellence in Practice Award: Electronic Learning Technologies,"*Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning* THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers,"*Emedia Professional* 10(8):6678 (Aug. 1997).
Fritz, "ToolBook II: Asymetrix's updated authoring software tackles the Web,"*Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support,"*Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring,"*Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Leaning a Reading Tutor that Listens" *American Association for Artificial Intelligence*, Web page, unknown date Aug. 1997.
Muffler et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs*," *Communications ACM* 38(7):27-39 (Jul. 1995).
O'Herron, "CenterForce Technologies CenterForce Analyzer," Web page unverified print dateof Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1] , authored by Alan Lesgold, unverified cover date of Mar. 5, 1998.

Papa et al., "A Differential Diagnostic Skills Assessment and Tutorial Tool,"*Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom,"*InfoWorld* 20(47):6467 (Nov. 23, 1998).
Unknown Author, "Long-distance learning," *Info World* 20(36):7676 (1998).
Untitled, 10$^{th}$ Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents,"*Technical Training* pp. 12-15 (Oct. 1997).
Witness Systems promotional brochure for eQuality entitled "Building Customer Loyalty Through BusinessDriven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst, *It's Baa-aack. How Interative TV is Sneaking Into Your Living Room*, The AnchorDesk, May 10, 1999.
Berst, *Why Interactive TV Won't Turn You on (Yet)*, The AnchorDesk, Jul. 13, 1999.
Borland and Davis, *US West Plans Web Services on TV*, CNETNews.com, Nov. 22, 1999.
Brown, *Let PC Technology Be Your TV Guide*, PC Magazine, Jun. 7, 1999.
Brown, *Interactive TV: The Sequel*, NewMedia, Feb. 10, 1998.
Cline, Déjà vu—*Will Interactive TV Make It This Time Around*?, DevHead, Jul. 9, 1999.
Crouch, *TV Channels on the Web*, PC World, Sep. 15, 1999.
D'Amico, *Interactive TV Gets $99 set-top box*, IDG.net, Oct. 6, 1999.
Davis, *Satellite Systems Gear Up for Interactive TV Fight*, CNETNews.com, Sep. 30, 1999.
Diederich, *Web TV Data Gathering Raises Privacy Concerns*, ComputerWorld, Oct. 13, 1998.
*EchoStar, MediaX Mix Interactive Multimedia With Interactive Television*, PRNews Wire, Jan. 11, 1999.
Furger, *The Internet Meets the Couch Potato*, PCWorld, Oct. 1996.
*Hong Kong Comes First with Interactive TV*, SCI-TECH, Dec. 14, 1997.
Needle, *Will The Net Kill Network TV*? PC World Online, Mar. 10, 1999.
Kane, *AOL-Tivo: You've Got Interactive TV*, ZDNN, Aug. 17, 1999.
Kay, *E-Mail in Your Kitchen*, PC World Online, 093/28/96.
Kenny, *TV Meets Internet*, PC World Online, Mar. 28, 1996.
Linderholm, *Avatar Debuts Home Theater PC*, PC World Online, Dec. 1, 1999.
Rohde, *Gates Touts Interactive TV*, InfoWorld, Oct. 14, 1999.
Ross, *Broadcasters Use TV Signals to Send Data*, PC World Oct. 1996.
Stewart, *Interactive Television at Home: Television Meets the Internet*, Aug. 1998.
Wilson, *U.S. West Revisits Interactive TV*, Interactive Week, Nov. 28, 1999.

* cited by examiner

SYSTEMS AND METHODS FOR ANALYZING COMMUNICATION SESSIONS

CROSS REFERENCE TO RELATED APPLICATION

This application is a Continuation of U.S. patent application Ser. No. 11/540,736, entitled "Systems and Methods for Analyzing Communication Sessions," filed on Sep. 29, 2006, which is incorporated by reference herein.

TECHNICAL FIELD

The present disclosure generally relates to analysis of communication sessions.

DESCRIPTION OF THE RELATED ART

Contact centers are staffed by agents who are trained to interact with customers. Although capable of conducting these interactions using various media, the most common scenario involves voice communications using telephones. In this regard, when a customer contacts a contact center by phone, the call is typically provided to an automated call distributor (ACD) that is responsible for routing the call to an appropriate agent. Prior to an agent receiving the call, however, the call can be placed on hold by the ACD for a variety of reasons. By way of example, the ACD can enable an interactive voice response system (IVR) to query the user for information so that an appropriate queue for handling the call can be determined As another example, the ACD can place the call on hold until an agent is available for handling the call. In such an on hold period, music (which is referred to as "music on hold") and/or various announcements (which can be prerecorded or use synthetic human voices) can be provided to the customer.

For a number of reasons, such as compliance regulations, it is commonplace to record communication sessions. Notably, an entire call (including on hold periods) can be recorded. However, a significant portion of such a recording can be attributed to music on hold, announcements and/or IVR queries that do not tend to provide substantive information for analysis.

SUMMARY

In this regard, systems and methods for analyzing communication sessions are provided. An exemplary embodiment of such a system comprises a voice analysis system that is operative to receive information corresponding to a communication session and perform processing on the information. The voice analysis system is configured to exclude a portion of the information corresponding to the communication session, that is not attributable to speech of at least one party of he communication session, from processing.

An exemplary embodiment of a method for analyzing communication sessions comprises excluding a portion of the communication session, not attributable to at least one party of the communication session, from processing.

Another exemplary embodiment of a method for analyzing communication sessions comprises: recording the communication session; identifying those portions of the communication session not containing speech of at least one of an agent and a customer; and performing processing on the recording of the communication session based, at least in part, on whether the portions contain speech of at least one of the agent and the customer.

Other systems, methods, features, and advantages of the present disclosure will be or become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other.

Like reference numerals designate corresponding parts throughout the several views.

DETAILED DESCRIPTION

As will be described in detail here with reference to several exemplary embodiments, systems and methods for analyzing communication sessions can potentially enhance post-recording processing of communication sessions. In this regard, it is known that compliance recording and/or recording of communication sessions for other purposes involves recording various types of information that are of relatively limited substantive use. By way of example, music, announcements and/or queries by IVR systems commonly are recorded. Such information can cause problems during post-recording processing in that these types of information can make it difficult for accurate processing by speech recognition and phonetic analysis systems. Additionally, since such information affords relatively little substantive value, inclusion of such information tends to use recording resources, i.e., the information takes up space in memory, thereby incurring cost without providing corresponding value.

Figure 1:
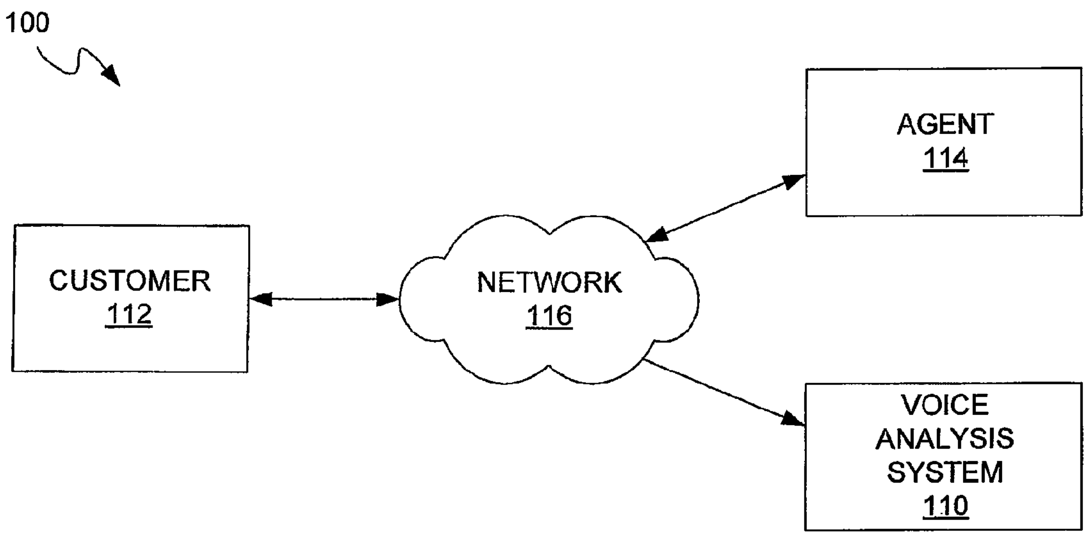
FIG. 1 is a schematic diagram illustrating an embodiment of a system for analyzing communication sessions.

Referring now to FIG. 1, FIG. 1 depicts an exemplary embodiment of a system for analyzing communication sessions that incorporates a voice analysis system 102. Voice analysis system 102 receives information corresponding to a communication session, such as a session occurring between a customer 104 and an agent 106 via a communication network 108. As a non-limiting, example, communications network 108 can include a Wide Area Network (WAN), the Internet and/or a Local Area Network (LAN). In some embodiments, the voice analysis system can receive the information corresponding to the communication session from a data storage device, e.g., a hard drive, that is storing a recording of the communication session.

Figure 2:
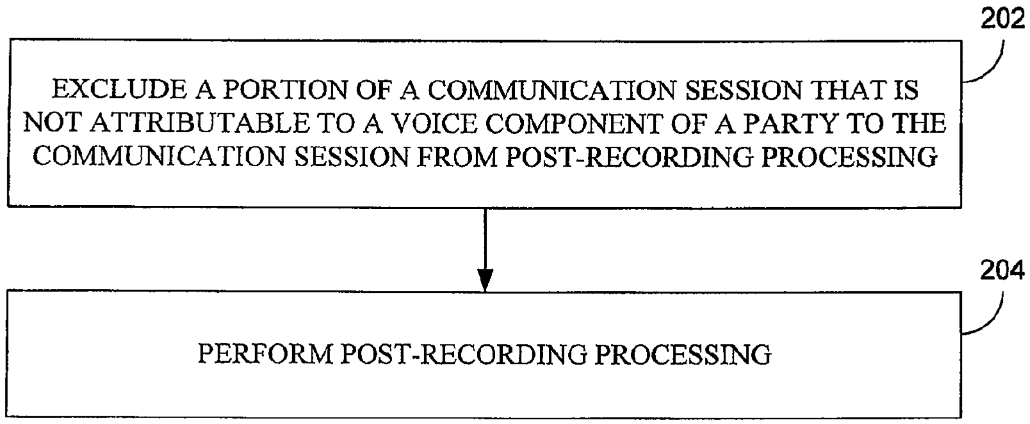
FIG. 2 is a flowchart depicting functionality (or method steps) associated with an embodiment of a system for analyzing communication sessions.

FIG. 2 depicts the functionality (or method) associated with an embodiment of a system for analyzing communications, such as the embodiment of FIG. 1. In this regard, the depicted functionality involves excluding a portion of a communication session from post-recording processing (block 202). That is, information that does not correspond to a voice component of a party to the communication session, e.g., the agent and the customer, can be excluded. Notably, various types of information, such as music, announcements and/or queries of an IVR system are not attributable to one of the parties. As such, these types of information can be excluded from post-recording processing (block 204), which can involve speech recognition and/or phonetic analysis.

In some embodiments, information that does not correspond to a voice component of any party to the communication session is deleted from the recording of the communication session. As another example, such information could be identified and any post-recording processing algorithms could ignore those portions, thereby enabling processing resources to be devoted to analyzing other portions of the recordings.

As a further example, at least with respect to announcements and queries from IVR systems that involve pre-recorded or synthetic human voices (i.e., computer generated voices), information regarding those audio components can be provided to the post-recording processing algorithms so that analysis can be accomplished efficiently. In particular, if the processing system has knowledge of the actual words that are being spoken in those audio components, the processing algorithm can more quickly and accurately convert those audio components to transcript form (as in the case of speech recognition) or to phoneme sequences (as in the case of phonetic analysis).

Figure 3:
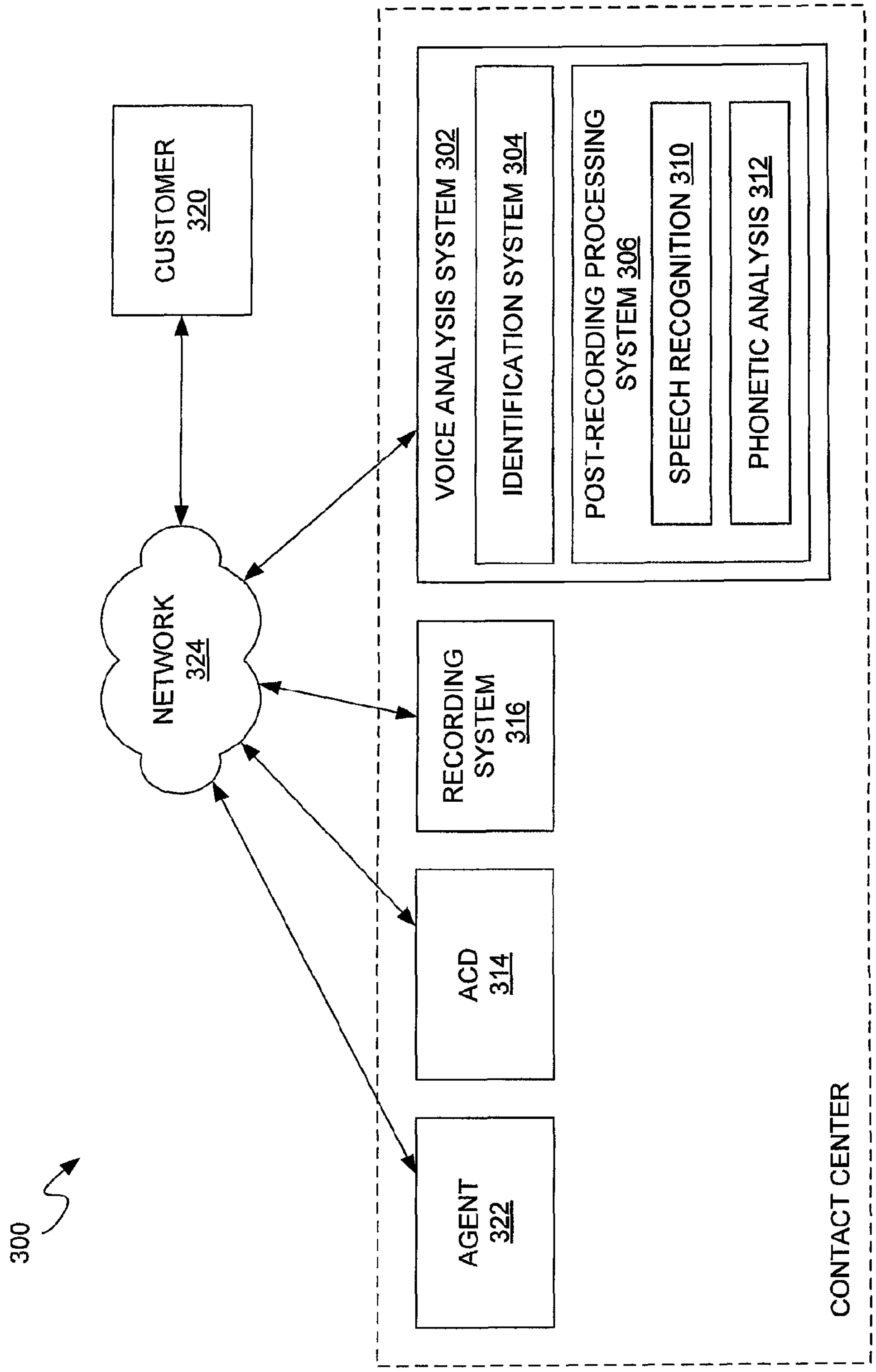
FIG. 3 is a schematic diagram illustrating another embodiment of a system for analyzing communication sessions.

FIG. 3 depicts another exemplary embodiment of a system for analyzing communication sessions. In this regard, system 300 is implemented in a contact center environment that includes a voice analysis system 302. Voice analysis system 302 incorporates an identification system 304 and a post-recording processing system 306. The post-recording processing system incorporates a speech recognition system 310 and a phonetic analysis system 312.

The contact center also incorporates an automated call distributor (ACD) 314 that facilitates routing of a call between the customer and the agent. The communication session is recorded by a recording system 316 that is able to provide information corresponding to the communication session to the voice analysis system for analysis.

In operation, the voice analysis system receives information corresponding to a communication session that occurs between a customer 320 and an agent 322, with the session occurring via a communication network 324. Specifically, the ACD routes the call so that the customer and agent can interact and the recorder records the communication session.

With respect to the voce analysis system 302, the identification system 304 analyzes the communication session (e.g., from the recording) to determine whether post-recording processing should be conducted with respect to each of the recorded portions of the session. Based on the determinations, which can be performed in various manners (examples of which are described in detail later), processing can be performed by the post-recording processing system 306. By way of example, the embodiment of FIG. 3 includes both a speech recognition system and a phonetic analysis system that can be used either individually or in combination to process portions of the communication session.

Notably, the ACD 314 can be responsible for providing various announcements to the customer. In some embodiments, these announcements can be provided via synthetic human voices and/or recordings. It should be noted that other types of announcements can be present in recordings that are not provided by an ACD. By way of example, a telephone central office can introduce announcements that could be recorded. As another example, voice mail systems can provide announcements. The principles described herein relating to treatment of ACD announcements are equally applicable to such other forms of announcements regardless of the manner in which the announcements become associated with a recording.

Additionally or alternatively, the ACD can facilitate interaction of the customer with an IVR system that queries the customer for various information. Additionally or alternatively, the ACD can provide music on hold, such as when the call is queued awaiting pickup by an agent. It should be noted that other types of music can be present in recordings that are not provided by an ACD. By way of example, a customer could be speaking to an agent when music is being played in the background. The principles described herein relating to treatment of ACD music on hold are equally applicable to such other forms of music regardless of the manner in which the music becomes associated with a recording.

Figure 4:
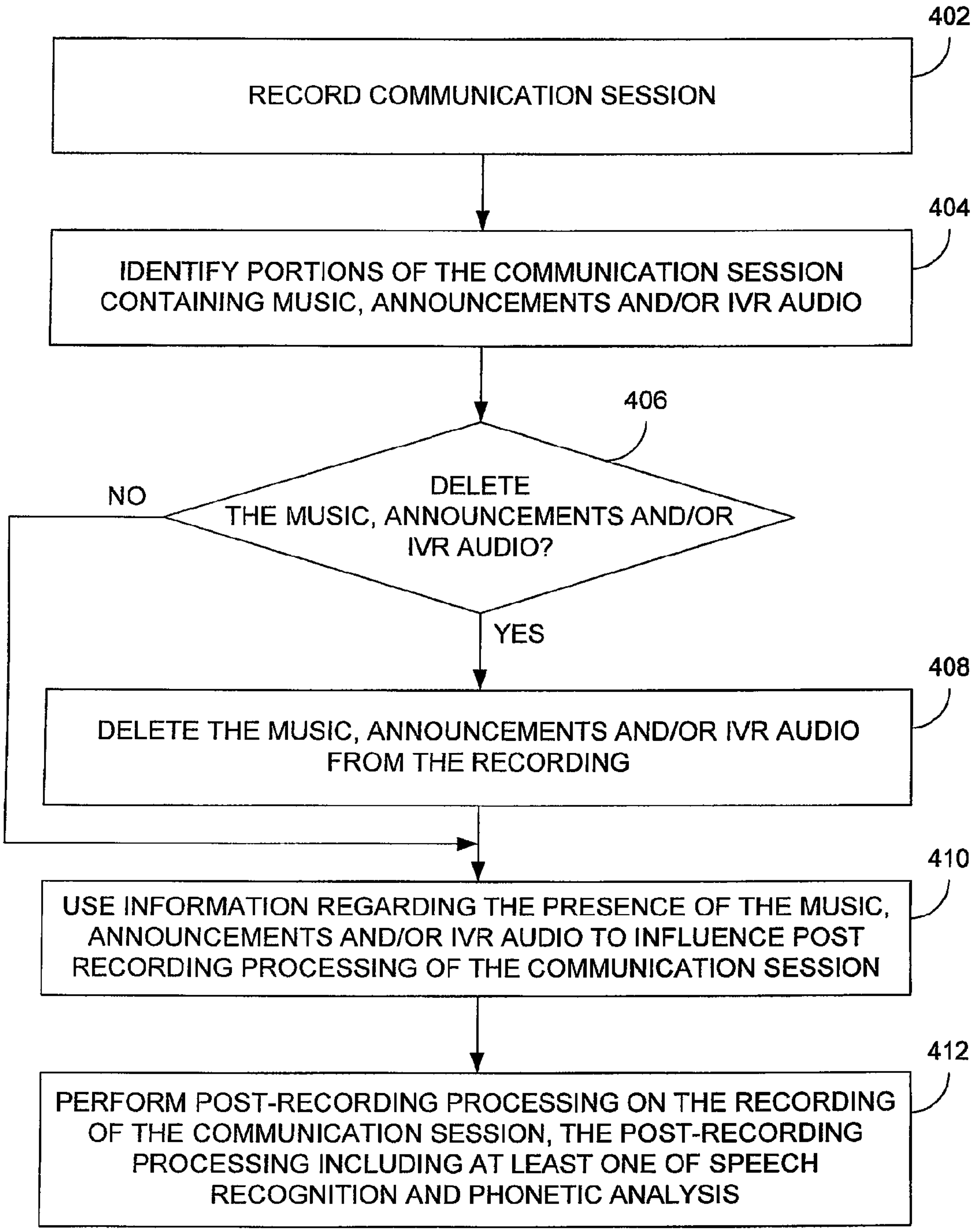
FIG. 4 is a flowchart depicting functionality (or method steps) associated with an embodiment of a system for analyzing communication sessions.
Figure 5:
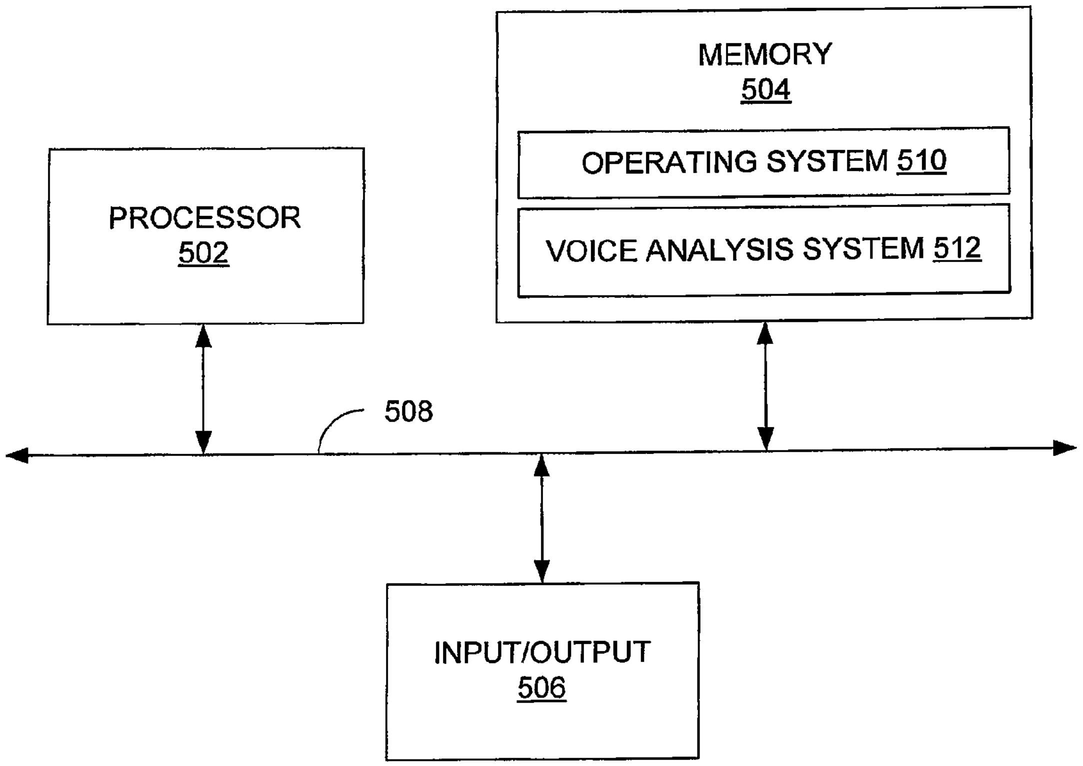
FIG. 5 is a schematic diagram of an embodiment of a system for analyzing communication sessions that is implemented by a computer.

FIG. 4 is a flowchart depicting functionality of an embodiment of a system for analyzing communication sessions, such as the system depicted in FIG. 3. In this regard, the functionality (or method steps) may be construed as beginning at block 402, in which a communication session is recorded. In block 404, portions of the communication session are identified as containing music, announcements and/or IVR audio. Then, as depicted in block 406, a determination is made as to whether the music, announcements and/or IVR audio that were identified are to be deleted from the recording. If it is determined that the music, announcements and/or IVR audio are to be deleted, the process proceeds to block 408, in which deletion from the recording is performed. The, the process proceeds to block 410. If, however, it is determined that the music, announcements and/or IVR audio are not to be deleted, the process also proceeds to block 410.

In block 410, information regarding the presence of the music, announcements and/or IVR audio is used to influence post-recording processing of a communication session. By way of example, the corresponding portions of the recording can be designated or otherwise flagged with information indicating that music, announcements and/or IVR audio is present. Other manners in which such a post-recording process can be influenced will be described in greater detail later.

Thereafter, the process proceeds to block 412, in which post-recording processing is performed. In particular, such post-recording processing can include at least one of speech recognition and phonetic analysis.

With respect to the identification of various portions of a communication session, a voice analysis system can be used to distinguish those portions of a communication session that include voice components of a party to the communication from other audio components. Depending upon the particular embodiment, such a voice analysis system could identify the voice components of the parties as being suitable for both post-recording analysis and/or could identify other portions as not being suitable for post-recording analysis.

In some embodiments, a voice analysis system is configured to identify dual tone multi-frequency (DTMF) tones, i.e., the sounds generated by a touch tone phone. In some of these embodiments, the tones can be removed from the recording. In removing such tones prior to speech recognition and/or phonetic analysis, such analysis may be more effective as the DTMF tones may no longer mask some of the recorded speech.

As an additional benefit, the desire for improved security of personal information may require in some circumstances that such DTMF tones not be stored or otherwise made available for later access. For instance, a customer responding to an IVR system query may input DTMF tones corresponding to a social security number or a bank account number. Clearly, recording such tones could increase the likelihood of this information being compromised. However, an embodiment of a voice analysis system that deletes these tones does not incur this potential liability.

In some embodiments, signaling tones, such as distant and local ring tones and busy equipment signals, can be identified. With respect to the identification of ring tones, identification of regional tones can provide additional information about a call that may be useful. By way of example, such tones could identify the region to which an agent placed a call while a customer was on hold. Moreover, once identified, the signaling tones can be removed from the recording of the communication session.

Regional identification of audio components also can occur in some embodiments with respect to announcements. In this regard, some regions provide unique announcements, such as those originating from a central telephone office. For example, in the United States an announcement may be as follows, “I am sorry, all circuits are busy. Please try your call again later.” Identifying such an audio component in a recording could then inform a user that a party to the communication session attempted to place a call to the United States.

Various techniques can be used for differentiating the various portions of a communication session. In this regard, energy envelope analysis, which involves graphically displaying the amplitude of audio of a communication session, can be used to distinguish music from voice components. This is because music tends to follow established tempo patterns and oftentimes exhibits higher energy levels than voice components. Further, music may tend to exhibit fewer gaps than you find in conversations where inter-word and inter-sentence gaps are fairly regular. That is, in music, there is often a background beat or instrumental that rarely or never drops to zero.

Another technique for identifying both music and announcements is that the original source material, e.g. a CD, can be available for use as a template to help identify a portion of a session by correlating the energy envelope of the sampled period with that of the source material.

Additionally or alternatively, CTI information can be used for differentiating the various portions of a communication session. By way of example, if CTI information indicates “call transferred to queue X,” knowledge that queue X has a particular announcement associated therewith, such as music on hold, can be used to identify the portion of the session associated with that queue as containing music. Similarly, information from other sources, such as realtime and/or audit/log trail of IVR systems, can be used to identify which announcements were played to which call at what time.

In some embodiments, such identification can be accomplished manually, semi-automatically or automatically. By way of example, a semi-automatic mode of identification can include providing a user with a graphical user interface that depicts an energy envelope corresponding to a communication session. The graphical user interface could then provide the user with a sliding window that can be used to identify contiguous portions of the communication session. In this regard, the sliding window can be altered to surround a portion of the recording that is identified, such as by listening to that portion, as music. The portion of the communication session that has been identified within such a sliding window as being attributable to music can then be automatically compared by the system to other portions of the recorded communication session. When a suitable match is automatically identified, each such portion also can be designated as being attributable to music.

Additionally or alternatively, some embodiments of a voice analyzer system can differentiate between announcements and tones that are regional in nature. This can e accomplished by comparing the recorded announcements and/or tones to a database of known announcements and tones to check for parity. Once designations are made about the portions of a communication sessions containing regional characteristics, the actual audio can be discarded or otherwise ignored during post-recording processing. In this manner, speech analysis does not need to be undertaken with respect to those portions of the audio, thereby allowing speech analysis systems to devote more time and resources to other portions of the communication session. Notably, however, the aforementioned designations can be retained in the records of the communication session so that information corresponding to the occurrence of such characteristics is not discarded.

In some embodiments, a database can be used for comparative purposes to identify variable announcements. That is an announcement that includes established fields, within which information can be changed. An example of such a variable announcement includes an airline reservation announcement that indicates current rate promotions. Such an announcement usually includes a fixed field identifying the airline and then variable fields identifying a destination and a fare. Knowledge of the first variable field involving a destination could be used to simplify post-recording processing in some embodiments, whereas other embodiments may avoid processing of that portion once a determination is made that the portion corresponds to an announcement. Alternatively, a hybrid approach could involve not processing of audio corresponding to fixed fields and allowing post-recording processing on the audio corresponding to the variable fields.

Another form of variable announcements relates to voicemail systems. In this regard, voicemail systems use variable fields to inform a caller that a voice message can be recorded. In some embodiments, these announcements can be identified and handled such as described before. One notable distinction, however, involves the use of the actual voicemail message that is left by a caller. If such a caller indicates that the message is “private,” some embodiments can delete the message or otherwise avoid post-recording processing of the message.

FIG. 6 is a schematic diagram illustrating an embodiment of system for analyzing communication sessions that is implemented by a computer. Generally, in terms of hardware architecture, system 500 includes a processor 502, memory 504, and one or more input and/or output (I/O) devices interface(s) 506 that are communicatively coupled via a local interface 508. The local interface 506 can include, for example but not limited to, one or more buses or other wired or wireless connections. The local interface may have additional elements, which are omitted for simplicity, such as controllers, buffers (caches), drivers, repeaters, and receivers to enable communications.

Further, the local interface may include address, control, and/or data connections to enable appropriate communications among the aforementioned components. The processor may be a hardware device for executing software, particularly software stored in memory.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor. Additionally, the memory includes an operating system 510, as well as instructions associated with a voice analysis system 51, exemplary embodiments of which are described above.

One should note that the flowcharts included herein show the architecture, functionality and/or operation of a possible implementation of one or more embodiments that can be implemented in software and/or hardware. In this regard, each block can be interpreted to represent a module, segment, or portion of code, which comprises one or more executable instructions for implementing the specified logical functions. It should also be noted that in some alternative implementations, the functions noted in the blocks may occur out of the order in which depicted. For example, two blocks shown in succession may in fact be executed substantially concurrently or the blocks may sometimes be executed in the reverse order, depending upon the functionality involved.

One should note that any of the functions (such as depicted in the flowcharts) can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that many variations and modifications may be made to the above-described embodiments. All such modifications and variations are intended to be included herein within the scope of this disclosure and protected by the following claims.

The invention claimed is:

1. A method for analyzing communication sessions between a contact center and a customer, said method comprising:

recording the communication session at a computing device;

analyzing the communication session if the communication session is not a private communication session at the computing device; and if the communication session is not a private communication session:

identifying those portions of the communication session not containing speech of at least one of an agent and the customer at the computing device; and performing processing on the recording of the communication session based, at least in part, on whether the portions contain speech of at least one of an agent and the customer at the computing device.

2. The method of claim 1, further comprising deleting the portions not attributable to at least one of the agent and the customer from the recording.

3. The method of claim 1, further comprising performing processing comprises performing post-recording processing on the remaining portions.

4. The method of claim 1, wherein identifying comprises identifying presence of music in the communication session.

5. The method of claim 1, wherein identifying comprises identifying presence of at least one of an announcement and audio from an interactive voice response (IVR) system; and performing post-recording processing comprises providing access to information corresponding to a database of potential announcements and potential audio from the IVR system such that the post-recording processing can analyze the at least one of the announcement and the audio using the database.

6. The method of claim 1, wherein the private communication is a private voicemail message.

7. A method for analyzing communication sessions comprising:

analyzing the communication session if the communication session is not a private communication session at a computing device; and if the communication session is not a private communication session:

determining a portion of the communication session not attributable to a voice component of at least one party of the communication session at the computing device; and excluding the portion of the communication session, not attributable to a voice component of at least one party of the communication session, from processing at the computing device.

8. The method of claim 7, wherein the processing comprises speech recognition processing.

9. The method of claim 7, wherein the processing comprises phonetic analysis.

10. The method of claim 7, wherein the portion of the communication session comprises music.

11. The method of claim 10, wherein the music is provided as music on hold.

12. The method of claim 10, wherein the portion of the communication session comprises an announcement.

13. The method of claim 12, wherein the announcement comprises a synthetic human voice.

14. The method of claim 7, wherein the portion of the communication session comprises audio from an interactive voice response (IVR) system.

15. The method of claim 7, wherein the portion of the communication session comprises dual tone multi-frequency (DTMF) audio.

16. The method of claim 7, further comprising recording the communication session.

17. The method of claim 16, further comprising deleting the portion not attributable to the at least one party from the recording.

18. The method of claim 7, wherein excluding comprises identifying portions of the communication session not attributable to the at least one party.

19. A system for analyzing communication sessions comprising:

a voice analysis system operative to receive information corresponding to a communication session and perform processing on the information, wherein voice analysis system is configured to:

analyze the communication session if the communication session is not a private communication session; and if the communication session is not a private communication session:

determine a portion of the communication session not attributable to a voice component of at least one party of the communication session at the computing device; and exclude a portion of the information corresponding to the communication session, that is not attributable to speech of at least one party of the communication session, from the processing.

20. The system of claim 19, wherein the voice analysis system is configured to perform at least one of speech recognition and phonetic analysis during the processing.

* * * * *